Figure 1:
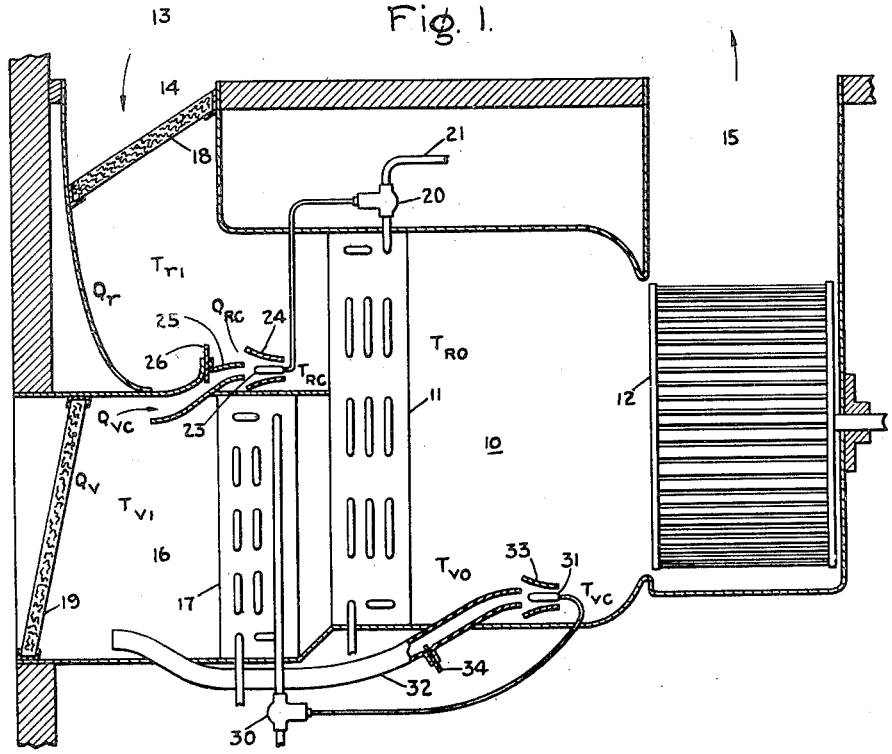

Aug. 23, 1949.  A. B. HUBBARD  2,480,098

THERMOSTATIC MODULATING SYSTEM

Filed July 24, 1946

Inventor:
Albert B. Hubbard,
by Edwin L. Rich
His Attorney.

Patented Aug. 23, 1949

2,480,098

UNITED STATES PATENT OFFICE 2,480,098

THERMOSTATIC MODULATING SYSTEM

Albert B. Hubbard, Caldwell, N. J., assignor to General Electric Company, a corporation of New York Application July 24, 1946, Serial No. 685,849

4 Claims. (Cl. 236—37)

The invention relates to thermostatic modulating systems and particularly to the proportionate modulating thermostatic control of an improved double stage heat exchange system for providing more uniform temperature regulation.

The invention provides heat exchange modulating improvements that are particularly advantageous in thermostatically modulating the heat exchange rates required to regulate uniformly the temperature within an enclosed space such as a room supplied with outdoor ventilating air under widely varying outdoor temperature conditions or in other thermostatic heat exchange modulating service where a heat exchange temperature differential similar to the indoor-outdoor temperature differential of the room is involved.

Conventional heat exchange modulating systems utilize some suitable form of thermostatic modulating device such as a thermostatically operated valve or the like for modulating the heat exchange rate directly in response to variations in the controlled temperature, for example, the room temperature. Therefore, in such conventional systems the controlled temperature can not be maintained uniform but inherently must progressively vary or "droop" in order correspondingly to vary the heat exchange rate between minimum and maximum limits.

One of the objects of the present invention is to provide an improved "droop" compensated thermostatic modulating system for operating a heat exchanger to obtain substantially uniform regulation of one of the heat exchange differential temperatures by utilizing variations of the temperature differential to compensate the inherent "droop" of the heat exchange rate modulating thermostatic device.

The improved system operates on the principle that the heat exchange rate required to maintain uniform one of two temperature conditions in heat exchange relation will vary substantially proportionately to the variable differential between the temperature that is to be maintained uniform, for example the temperature of the room air, and the separately variable or ambient differential temperature that determines the heat loss or gain, for example the temperature of the outdoor air. In a preferred form, the improved system utilizes an improved Venturi means for proportionately mixing the mediums having a heat exchange temperature differential so as to obtain a composite variable control temperature that will enable the thermostatic heat exchange modulating device having "droop" to vary the rate of heat exchange as required to maintain substantially constant one of the two differential temperature mediums that jointly determine the heat exchange load.

Thus another object is to provide an improved thermostatic temperature regulating system having a heat exchange rate modulating thermostatic device operating with a "droop" in response to a specially provided composite or resultant control temperature condition that can be made to vary substantially proportionately to the differential between the two separate temperature conditions that determine the heat exchange load so as to compensate the "droop" of the thermostatic device and thereby maintain one of the two differential temperature conditions substantially constant.

Another object is to provide improved differential temperature proportioning means for obtaining the special composite or resultant control temperature conditions to which the heat exchange modulating thermostatic device is responsive.

Another object is to provide an improved double stage heat exchange system for proportionately controlling the component parts of a composite variable heat exchange load so as to obtain more accurate modulating control by a complementary pair of "droop" compensated heat exchange rate thermostatic modulating devices and in this way insure more uniform overall temperature regulation. The improved complementary double stage heat exchange system is particularly advantageous where the outside ventilation air supplied to a room constitutes one part of the composite heat exchange load and the normal heat loss or gain of the recirculated air of the room constitutes a complementary part of the variable heat exchange load or in other similar complementary double stage heat exchange control service.

Figure 2:
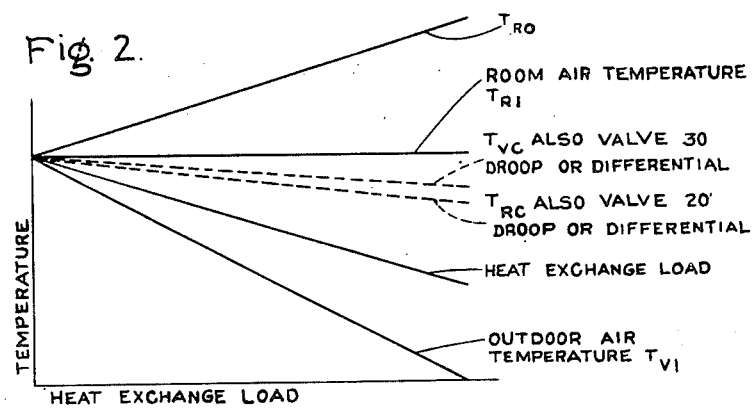

Further objects and advantages of the invention will appear in the following description of the accompanying drawings in which Fig. 1 schematically shows a room heating and ventilating system embodying the improvements of the present invention in a preferred form and Fig. 2 is a chart showing typical proportionate relationships between the room air temperature, the outdoor air temperature, the heat exchange load, and the corresponding thermostatic "droop" and proportionate resultant control temperatures provided in accordance with the present invention.

As shown in Fig. 1, the improved room heating and ventilating apparatus, indicated generally by the reference character 10, is provided with a main heat exchanger 11 of the conventional finned tube type for heating the room air recirculated through the upper part thereof by the continuously operating blower 12 from room 13 through duct 14 and returned to the room through duct 15 as well as for completing the final stage of heating the ventilation air admitted from outdoors through the duct 16 to pass through the lower part of the heat exchanger 11 after the initial stage of heating by the auxiliary heat exchanger 17. In the preferred form shown, ducts 14 and 16 are proportioned so that substantially equal quantities of recirculated air and ventilation air are passed respectively through the upper and lower parts of main heat exchanger 11. Thus the quantity of recirculated room air $Q_r$ passing through duct 14 is substantially equal to the quantity of ventilation air $Q_v$ passing through the duct 16. The recirculated room air in duct 14 is at a temperature $T_{ri}$ corresponding substantally to the room temperature condition while the temperature of the ventilation air $T_{vi}$ in duct 16 corresponds substantially to the outdoor temperature condition.

The auxiliary heat exchanger 17 also is of the conventional finned tube type and is proportioned to provide a heat exchange capacity sufficient to raise the temperature of the ventilation air in the first stage of heating from the outdoor air temperature $T_{vi}$ to the recirculated room air temperature $T_{ri}$. The main heat exchanger 11 has a heat exchange capacity sufficient to raise the temperature of the total volume of recirculated and ventilating air in the second stage of heating from temperature $T_{ri}$ to temperature $T_{vo}$ to supply the normal heat losses of the room. Consequently both heat loads will vary substantially proportionately to the differential between the outdoor air temperature $T_{vi}$ and the room air temperature $T_{ri}$. Thus to facilitate more accurate and uniform control, the total heat exchange load of the heat exchange apparatus 10 is divided into two complementary parts, one corresponding to the heat loss due to the introduction of ventilation air into the room and the other corresponding to the normal heat loss of the room. However, it is not necessary that $Q_v$ always equal $Q_r$ since the heat exchangers 11 and 17 may be proportioned to suit varying needs and heat exchanger 11 may be divided in proportion to the desired $Q_r$ and $Q_v$ so as to maintain the two face velocities of exchanger 11 substantially equal in each case. Preferably the air pressure drop through ducts 14 and 16 are substantially equalized by means of the air filters 18 and 19 or other restrictions located in the respective ducts as well as by the relative dimensions of the ducts.

The heat exchange rate of the main heat exchanger 11 is controlled by a thermostatically actuated valve 20 which may be of any conventional type adapted to vary the rate of supply of steam from the supply pipe 21 to heat exchanger 11 in accordance with variations in the temperature of the thermostatic or thermomotive operator that actuates valve 20. As shown, valve 20 is provided with a temperature responsive bulb 23 and suitable expansible bellows (not shown) for opening and closing valve 20 to modulate the heat exchange rate of heat exchanger 11. Such a conventional thermostatic valve inherently operates with a "droop" in the temperature to which bulb 23 is responsive in order to effect movement of the valve from the minimum steam flow to the maximum steam flow positions. Thus, bulb 23 must be at a predetermined set temperature when the valve is fully closed. The temperature of bulb 23 then must drop from the set value at which valve 20 is closed to some lower temperature in order to effect opening of the valve and to a still lower temperature to effect the maximum opening of the valve. Consequently, such a conventional thermostatic valve itself is unable to provide a uniform temperature regulation.

In accordance with the present invention improved temperature proportioning means are provided for subjecting the bulb 23 to a special resultant temperature $T_{rc}$ varying substantially proportionately to the differential between the room recirculated air temperature $T_{ri}$ and the outdoor air temperature $T_{vi}$ in order to compensate for the "droop" normally produced in the operation of the valve 20. This is accomplished by providing the converging baffle 24 for directing a part $Q_{rc}$ of the recirculated air passing through ducts 14 over the temperature responsive bulb 23 and a cooperating nozzle 25 communicating with duct 16 and provided with an adjustable damper 26 for mixing an adjustable part $Q_{vc}$ of the ventilation air with the recirculated air. In this way a resultant mixed air temperature $T_{rc}$ can be obtained that will vary proportionally to a predetermined function of the differential between the room air temperature $T_{ri}$ and the ventilation air temperature $T_{vi}$ that determines the variable heat loss rate of the room 13 and at the same time have a proportionate relationship such that $T_{ri} - T_{rc}$ is substantially equal to the "droop" of the thermostatic heat exchange rate modulating valve 20 at each rate. Preferably the correlation of the improved temperature proportioning means is such that neglecting differences in density, the temperature $T_{rc}$ of the air mixture passing over the control bulb 23 is:

$$T_{rc} = \frac{Q_{vc}T_{vi} + Q_{rc}T_{ri}}{Q_{vc} + Q_{rc}} \quad (1)$$

From which can be derived:

$$T_{ri} - T_{rc} = K(T_{ri} - T_{vi}) \quad (2)$$

where $$K = \frac{Q_{vc}}{Q_{vc} + Q_{rc}} \quad (3)$$

Thus $Q_{vc}$ can be adjusted so that $T_{ri} - T_{rc}$ will substantially correspond to the "droop" or differential of the control valve 20 at all rates of heat exchange. With such adjustment the temperature of the recirculated air $T_{ri}$ need not be less than the desired room temperature by the amount of the thermostatic valve "droop" or differential as is usually the case. Moreover, the heat exchange rate of the main heat exchanger 11 is under the control of the temperature of the recirculated air as modified by mixing a portion of the ventilating air therewith. Thus variations in the ventilation air temperature determines the approximate opening of valve 20 subject to any small corrections necessitated by minor variations in the temperature of the recirculated room air.

As shown in the chart of Fig. 2 when the improved temperature proportioning means comprising the baffle 24 and nozzle 25 is properly proportioned and adjusted so that the resultant control temperature $T_{rc}$ variation substantially equals the "droop" or operating temperature differential of the valve 20 over the required operating range, then the room temperature $T_{ri}$ will remain substantially constant even though the indoor-outdoor air temperature differential varies over a corresponding range. To obtain this result the adjustable mixing control damper 26 is set on a "design day" on which the maximum heat loss of the room will occur so that the valve 20 will be sufficiently open to enable the main heat exchanger 11 to supply the maximum heat loss of the room 13. As the outdoor temperature increases, then the differential $T_{ri}-T_{ro}$ will decrease with a corresponding decrease in the heat loss of the room and likewise with a corresponding decrease in the opening of valve 20 so as to vary the heat exchange rate of the heat exchanger 11 proportionally to balance the reduced heat loss. For example, if the thermostatic valve 20 is set to close at 70° F. and has an operating "droop" or differential of 5° F. under the maximum heat exchange load conditions, the specially proportioned control temperature $T_{rc}$ must be 65° F. when the indoor-outdoor temperature differential and also the heat loss of room 13 is a maximum under such correlated conditions the recirculated air temperature $T_{ri}$ and therefore the room temperature will be maintained substantially uniform at 70° F. throughout the normal operating range of thermostatic modulating valve 20 since the "droop" thereof is effectively compensated.

With the improved temperature proportioning means, a change in ventilation air temperature $T_{vi}$ usually precedes the need for a change in the heat exchange rate of the heat exchanger 11. Therefore the improved temperature proportioning and mixing means will provide a certain amount of so-called "anticipation." Furthermore, if the room 13 is on the windward side of the building, then $Q_{vo}$ will automatically become a larger proportion of the air mixture causing a decrease in $T_{rc}$ which in turn would increase the operating rate of the heat exchanger 11. Such an automatic increase is usually desirable for the thermostatic temperature control of the rooms on the windward side of the building. The action and requirements will be just the opposite on the lee side. Therefore, the improved temperature proportioning means of the present invention tends to also compensate for the effect of wind conditions.

The heat exchange rate of auxiliary heat exchanger 17 is controlled by the thermostatic valve 30 having a temperature responsive bulb 31 subjected to a specially proportioned control temperature $T_{vc}$ so as to compensate the "droop" of valve 30 in accordance with the present invention. To accomplish this result a small part of the ventilation air is by-passed by means of tube 32 around both of the heat exchangers 11 and 17 and mixed with a part of the air that has been heated by both heat exchangers. As shown, bulb 31 is mounted within the converging baffle 33 which directs thereon a part of the air heated by the two heat exchangers 11 and 17 to temperature $T_{vo}$. The by-pass tube 32 supplies a proportioned quantity of the ventilation air at temperature $T_{vi}$ as determined by the adjustment of the damper 34 to be mixed with the air heated to temperature $T_{vo}$. As a result of the mixing of the proportioned quantities of air at temperatures $T_{vi}$ and $T_{vo}$, the mixture has a resultant temperature indicated as $T_{vc}$ which will vary proportionally to the differential between the temperatures $T_{vo}$ and $T_{vi}$. Hence by adjusting damper 34 on the maximum heat loss "design day" at the same time damper 26 is adjusted, $T_{vo}$ can be made to equal $T_{ro}$. Under such conditions the auxiliary heat exchanger 17 will be heating the ventilation air supplied through duct 16 in the first stage substantially to the same temperature as that of the recirculated air flowing through duct 14. Then the main heat exchanger 11 will proportionately increase the temperature of the ventilating air in the second stage to the same extent as the increase in the temperature of the recirculated air so that $T_{vo}$ will be substantially equal to $T_{ro}$. Thus when the control temperature $T_{vc}$ is proportioned to obtain this result on the "design day" when the maximum heat exchange load is obtained, then this control temperature $T_{vc}$ will correspond to the particular "droop" or differential of the thermostatic valve 30 required to supply the maximum heat exchange load of heat exchanger 17. The "droop" of the valve 30 may be different from the "droop" of valve 20 as indicated in the chart of Fig. 2.

As the total heating load decreases, valve 30 will vary the heat exchange rate of the auxiliary heat exchanger 17 so as to continue heating the ventilation air in the first stage to substantially the same temperature as the recirculated air and thereby maintain a balance between the temperatures of the air flow through the upper part of the main heat exchanger 11 and the air through the lower part thereof. In other words, $T_{vo}$ will be maintained substantially equal to $T_{ro}$ even upon wide variations of the indoor-outdoor temperature differential and corresponding wide variations of the heat exchange load. Moreover, even though the main heat exchanger 11 should accidently be shut off, the ventilation air would still be heated in the first stage to at least room temperature since the heating rate of the ventilation heat exchanger 17 is controlled by the ventilation air temperature biased by the heat exchange effect of both the ventilation air heat exchanger 17 and the main recirculation air heat exchanger 11.

What I claim as new and desire to secure by Letters Patent of the United States is:

1. A heat exchange system having in combination a first heat exchanger for varying the temperature of a heat transfer medium from one value to a second value, a second heat exchanger for varying the temperature of said medium from said second value to a third value, control means for varying the heat exchange rate of said second heat exchanger in accordance with a resultant of said first and second temperature values, and control means for varying the heat exchange rate of said first heat exchanger in accordance with a resultant of said first and said third temperature values.

2. A heat exchange system having in combination complementary heat exchangers, one having a double inlet for heat exchange medium and a single outlet and the other disposed in one of said inlets, means including a thermostat jointly responsive to the temperatures of the mediums in said inlets for controlling the heat exchange rate of said one heat exchanger, and means including a thermostat jointly responsive to the temperature of the mediums in said one inlet and said single outlet for controlling the heat exchange rate of the other heat exchanger.

3. A double stage heat exchange system having in combination a variable rate main heat exchanger and a separately variable rate auxiliary heat exchanger, said heat exchangers having complementary heat exchange loads, and correlated modulating control means for said heat exchangers, one including thermostatic means having temperature proportioning means for modulating the heat exchange rate of said main heat exchanger substantially as a predetermined function of the resultant temperature between two temperature conditions to operate said main heat exchange means to maintain one of said temperature conditions substantially constant and the other including thermostatic means and temperature proportioning means for modulating the heat exchange rate of said auxiliary heat exchanger substantially as a predetermined function of the resultant temperature between the other of said two temperature conditions and a temperature condition dependent upon the heat exchange rate of said main heat exchanger.

4. An air conditioner having in combination a main heat exchanger having a recirculation air inlet and a separate ventilation air inlet and a common outlet, an auxiliary heat exchanger in said ventilation air inlet, and correlated control means for said heat exchangers, one including thermostatic means for modulating the heat exchange rate of said main heat exchanger responsively to the resultant temperature of a mixture of the recirculation air and the ventilation air and the other including thermostatic means for modulating the heat exchange rate of said auxiliary heat exchanger responsively to the resultant temperature of a mixture of the outlet air and the ventilation air.

ALBERT B. HUBBARD.

REFERENCES CITED

The following references are of record in the file of this patent:

UNITED STATES PATENTS

| Number | Name | Date |
|---|---|---|
| 1,871,093 | Stem | Aug. 9, 1932 |
| 1,981,679 | Stem | Nov. 20, 1934 |
| 2,021,727 | Hillen et al. | Nov. 19, 1935 |
| 2,071,178 | Roessler | Feb. 16, 1937 |
| 2,268,048 | McElgin | Dec. 30, 1941 |